United States Patent
Lee et al.

(10) Patent No.: US 12,062,237 B2
(45) Date of Patent: Aug. 13, 2024

(54) ELECTRONIC DEVICE AND METHOD FOR PROVIDING SERVICE CORRESPONDING TO SELECTION OF OBJECT IN IMAGE

(71) Applicant: Samsung Electronics Co., Ltd., Suwon-si (KR)

(72) Inventors: Sihyoung Lee, Suwon-si (KR); Kyungjae Lee, Suwon-si (KR); Daehee Kim, Suwon-si (KR); Taehwa Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 398 days.

(21) Appl. No.: 17/432,271

(22) PCT Filed: Sep. 23, 2019

(86) PCT No.: PCT/KR2019/012364
§ 371 (c)(1),
(2) Date: Aug. 19, 2021

(87) PCT Pub. No.: WO2020/171333
PCT Pub. Date: Aug. 27, 2020

(65) Prior Publication Data
US 2022/0189175 A1 Jun. 16, 2022

(30) Foreign Application Priority Data

Feb. 19, 2019 (KR) .................. 10-2019-0019565

(51) Int. Cl.
*G06V 20/50* (2022.01)
*G06Q 30/0601* (2023.01)

(52) U.S. Cl.
CPC ......... *G06V 20/50* (2022.01); *G06Q 30/0643* (2013.01)

(58) Field of Classification Search
CPC .... G06V 20/50; G06V 20/60; G06Q 30/0643; G06Q 30/06; G06Q 30/0633; G06F 16/583; G06F 16/953
(Continued)

(56) References Cited

U.S. PATENT DOCUMENTS 10,474,919 B2 * 11/2019 Perschk .................. G06F 18/22
2015/0170002 A1 6/2015 Szegedy et al.
(Continued)

FOREIGN PATENT DOCUMENTS

KR 10-2006-0122791 A 11/2006
KR 10-2014-0109571 A 9/2014
(Continued)

OTHER PUBLICATIONS

Korean Office Action dated Mar. 28, 2024, issued in Korean Application No. 10-2019-0019565.

*Primary Examiner* — Ali Bayat
(74) *Attorney, Agent, or Firm* — Jefferson IP Law, LLP

(57) ABSTRACT

An electronic device and a method for providing a service corresponding to the selection of an object in an image are provided. The electronic device includes a camera, a display, a memory, and a processor operationally connected to the camera, the display, and the memory, wherein the processor can be configured to detect a plurality of object regions included in an image acquired using the camera, remove object regions having a size exceeding a threshold range from among the detected plurality of object regions, calculate the importance of objects within the threshold range, select a number of main objects that is no greater than the number of objects allowed by the electronic device, select auxiliary objects spatially related to the selected main objects, recognize the main objects and the auxiliary objects, recognize service attributes provided by the recognized main objects and auxiliary objects, determine services provided
(Continued)

by the main objects and the auxiliary objects, and display the determined services on the display.

8 Claims, 18 Drawing Sheets

(58) Field of Classification Search
USPC .......................................................... 382/190
See application file for complete search history.

(56) References Cited

U.S. PATENT DOCUMENTS

| | | | |
|---|---|---|---|
| 2015/0248719 A1* | 9/2015 | Hansen | G06Q 30/0627 |
| | | | 705/26.63 |
| 2016/0104058 A1 | 4/2016 | He et al. | |
| 2018/0276473 A1 | 9/2018 | Kim et al. | |
| 2019/0042574 A1* | 2/2019 | Kim | G06F 18/41 |
| 2019/0095466 A1* | 3/2019 | Zhai | G06F 16/56 |
| 2020/0184278 A1* | 6/2020 | Zadeh | G06N 3/044 |
| 2023/0222792 A1* | 7/2023 | Badr | H04N 23/633 |
| | | | 348/169 |

FOREIGN PATENT DOCUMENTS

| | | |
|---|---|---|
| KR | 10-2018-0051448 A | 5/2018 |
| KR | 10-1869895 B1 | 6/2018 |
| KR | 10-2018-0109304 A | 10/2018 |

* cited by examiner

FIG. 16

```
main_object ∈ Output_of_Main_Object_Selection_Module
candidate_object_list = Output_of_Object_Detection_Module
supporting_object_list = {}

FOR object ∈ candidate_object_list
    IF main_object ≠ object:
        IF IoU(main_object, object) > threshold_IoU  OR  main_object.include(object) is True:
            supporting_object_list.append(object)
```

ELECTRONIC DEVICE AND METHOD FOR PROVIDING SERVICE CORRESPONDING TO SELECTION OF OBJECT IN IMAGE

CROSS-REFERENCE TO RELATED APPLICATION(S)

This application is a U.S. National Stage application under 35 U.S.C. § 371 of an International application number PCT/KR2019/012364, filed on Sep. 23, 2019, which is based on and claims priority of a Korean patent application number 10-2019-0019565, filed on Feb. 19, 2019, in the Korean Intellectual Property Office, the disclosure of which is incorporated by reference herein in its entirety.

BACKGROUND

1. Field

The disclosure relates to an electronic device and a method that provide a service corresponding to an object selected in an image.

2. Description of Related Art

With the increasing usage of portable electronic devices, such as smartphones, tablet personal computers (PCs) and wearable devices, various functions are being applied to electronic devices.

Such an electronic device may include one or more cameras to take a photograph or a video.

The electronic device may detect an object in an image obtained by using a camera and provide a service corresponding to selection of the detected object.

The above information is presented as background information only to assist with an understanding of the disclosure. No determination has been made, and no assertion is made, as to whether any of the above might be applicable as prior art with regard to the disclosure.

SUMMARY

An existing electronic device may detect unnecessary objects of various types regardless of size or position in an image obtained by using a camera.

In this case, as the electronic device may have to provide a service for each of the detected objects, the amount of calculation and the time required for service preparation may increase according to the number of detected objects.

In addition, if a large number of objects are detected in comparison to the limited screen, the electronic device may fail to selectively provide a service for an object desired by the user.

Aspects of the disclosure are to address at least the above-mentioned problems and/or disadvantages and to provide at least the advantages described below. Accordingly, an aspect of the disclosure is to provide an electronic device and a method that can remove unnecessary objects from among the objects detected in an image, calculate the importance of objects, and provide a service corresponding to the selection of an object with high importance.

Additional aspects will be set forth in part in the description which follows and, in part, will be apparent from the description, or may be learned by practice of the presented embodiments.

In accordance with an aspect of the disclosure, an electronic device is provided. The electronic device includes a camera, a display, a memory, and a processor operably connected to the camera, the display, and the memory, wherein the processor may be configured to detect a plurality of object regions included in an image obtained by using the camera, remove an object region having a size out of a threshold range from among the detected plural object regions, calculate importance of objects within the threshold range, select main objects whose number is less than or equal to a number of objects allowed in the electronic device based on the calculated importance, select an auxiliary object having spatial relevance to a selected main object, recognize the main object and the auxiliary object, and recognize service attributes provided by the recognized main object and auxiliary object, and determine a service provided by the main object and auxiliary object, and display the determined service on the display.

In accordance with another aspect of the disclosure, a method for a processor of an electronic device to provide a service corresponding to selection of an object in an image is provided. The method includes detecting, by the processor, a plurality of object regions included in an image obtained by using a camera, removing an object region having a size out of a threshold range from among the detected plural object regions, calculating importance of objects within the threshold range, selecting main objects whose number is less than or equal to a number of objects allowed in the electronic device based on the calculated importance, selecting an auxiliary object having spatial relevance to a selected main object, recognizing the main object and the auxiliary object, and recognizing service attributes provided by the recognized main object and auxiliary object, and determining a service provided by the main object and auxiliary object, and displaying the determined service on a display.

In accordance with another aspect of the disclosure, an electronic device is provided. The electronic device includes a camera, a display, a memory, and a processor operably connected to the camera, the display, and the memory, wherein the processor may be configured to detect a plurality of object regions included in an image obtained by using the camera, determine a plurality of main objects among the detected plural object regions, select a main object providing a service based on an object position and object size from among the determined plural main objects, select an auxiliary object having spatial relevance to the selected main object, recognize the main object and the auxiliary object, and determine a number and types of services provided by the recognized main object and auxiliary object, determine a service card provided by the main object and auxiliary object based on the determined number and types of services, and display a service screen received from another electronic device on the display based on the determined service card.

In various embodiments of the disclosure, unnecessary objects are removed from among the objects detected in an image, the importance of objects is calculated, and a search service is provided in response to the selection of an object with high importance, so that it is possible to reduce the amount of calculation for the detected objects and the time required for service preparation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 16 is a diagram illustrating an algorithm for selecting an auxiliary object by using a processor of an electronic device according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
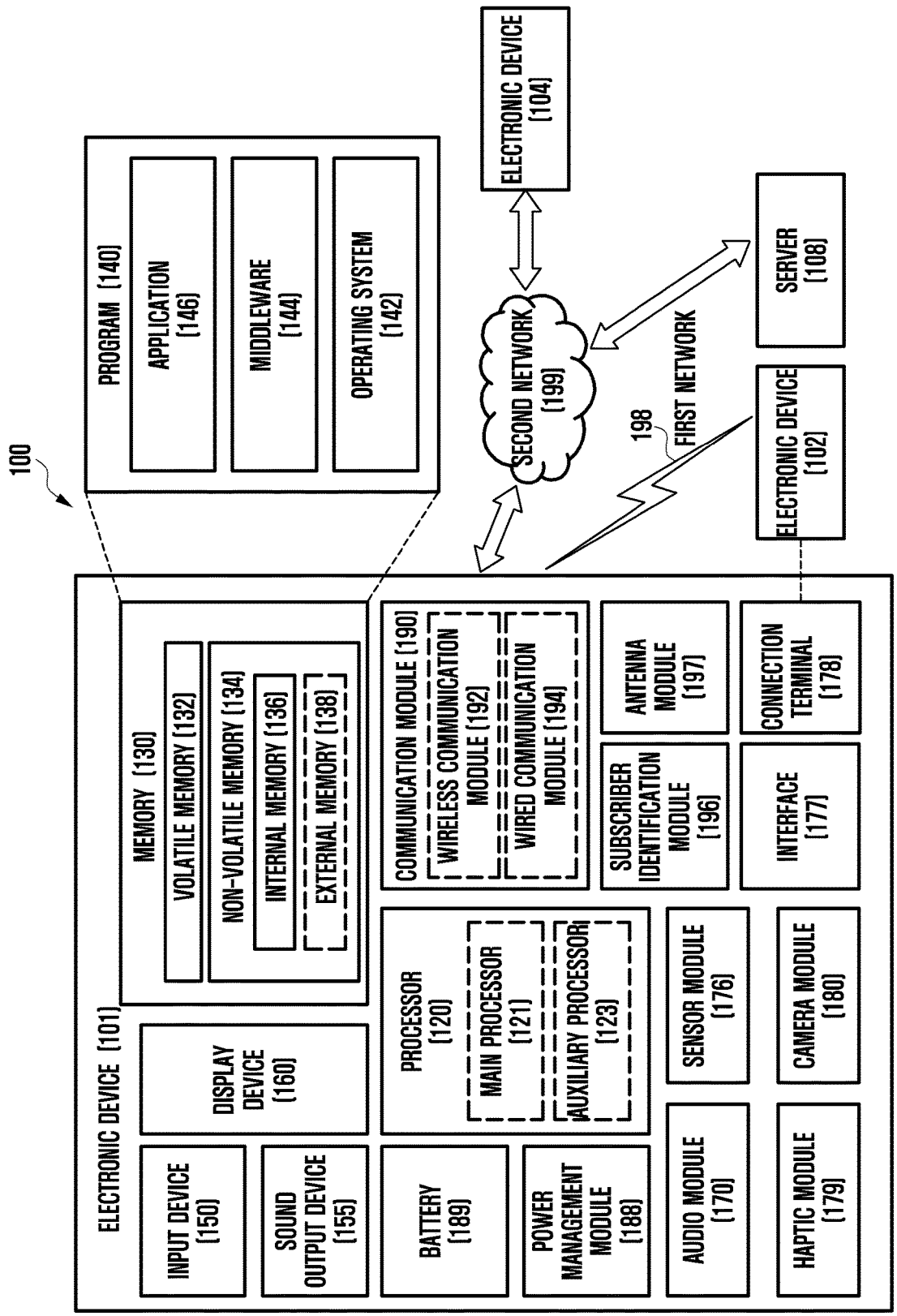
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform certain data processing or computation. According to an embodiment of the disclosure, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), and an auxiliary processor 123

(e.g., a graphical processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store certain data used by at least one component (e.g., the processor 120 or the sensor module 176) of the electronic device 101. The certain data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These certain types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit/receive a signal or power to/from an external entity (e.g., an external electronic device). According to some embodiments of the disclosure, the antenna module 197 may be formed of a conductor or a conductive pattern and may further include any other component (e.g., radio frequency integrated circuit (RFIC)). According to an embodiment of the disclosure, the antenna module 197 may include one or more antennas, which may be selected to be suitable for a communication scheme used in a specific communication network, such as the first network 198 or the second network 199 by, for example, the communication module 190. Through the selected at least one antenna, a signal or power may be transmitted or received between the communication module 190 and the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
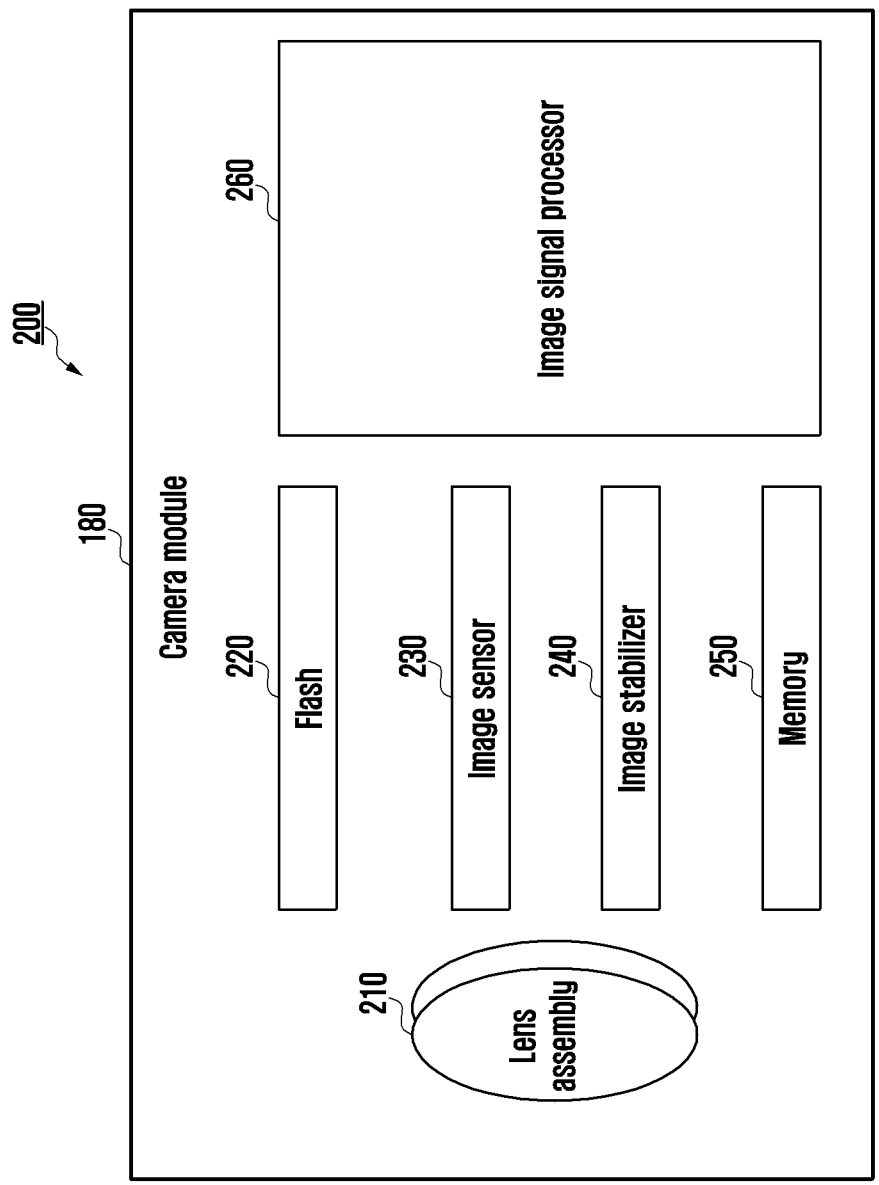
FIG. 2 is a block diagram of a camera module according to an embodiment of the disclosure.

FIG. 2 is a block diagram 200 illustrating a camera module according to an embodiment of the disclosure.

Referring to FIG. 2, the camera module 180 may include a lens assembly 210, a flash 220, an image sensor 230, an image stabilizer 240, a memory 250 (e.g., a buffer memory), or an ISP 260.

The lens assembly 210 may collect light emitted or reflected from an object whose image is to be taken. The lens assembly 210 may include one or more lenses. According to an embodiment of the disclosure, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment of the disclosure, the flash 220 may include one or more light emitting diodes (LEDs) (e.g., a red-green-blue (RGB) LED, a white LED, an IR LED, or an ultraviolet (UV) LED) or a xenon lamp.

The image sensor 230 may obtain an image corresponding to an object by converting light emitted or reflected from the object and transmitted via the lens assembly 210 into an electrical signal. According to an embodiment of the disclosure, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment of the disclosure, the image stabilizer 240 may detect such a movement by the camera module 180 or the electronic device 101 using a gyro sensor (not shown) or an acceleration sensor (not shown) disposed inside or outside the camera module 180. According to an embodiment of the disclosure, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the ISP 260. According to an embodiment of the disclosure, the memory 250 may be configured as at least part of the memory 130 or as a separate memory that is operated independently from the memory 130.

The ISP 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the ISP 260 may perform control (e.g., exposure time control or read-out timing control) with respect to at least one (e.g., the image sensor 230) of the components included in the camera module 180. An image processed by the ISP 260 may be stored back in the memory 250 for further processing, or may be provided to an external component (e.g., the memory 130, the display device 160, the external electronic device 102, the external electronic device 104, or the server 108) outside the camera module 180. According to an embodiment of the disclosure, the ISP 260 may be configured as at least part of the processor 120, or as a separate processor that is operated independently from the processor 120. If the ISP 260 is configured as a separate processor from the processor 120, at least one image processed by the ISP 260 may be displayed, by the processor 120, via the display device 160 as it is or after being further processed.

According to an embodiment of the disclosure, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 3:
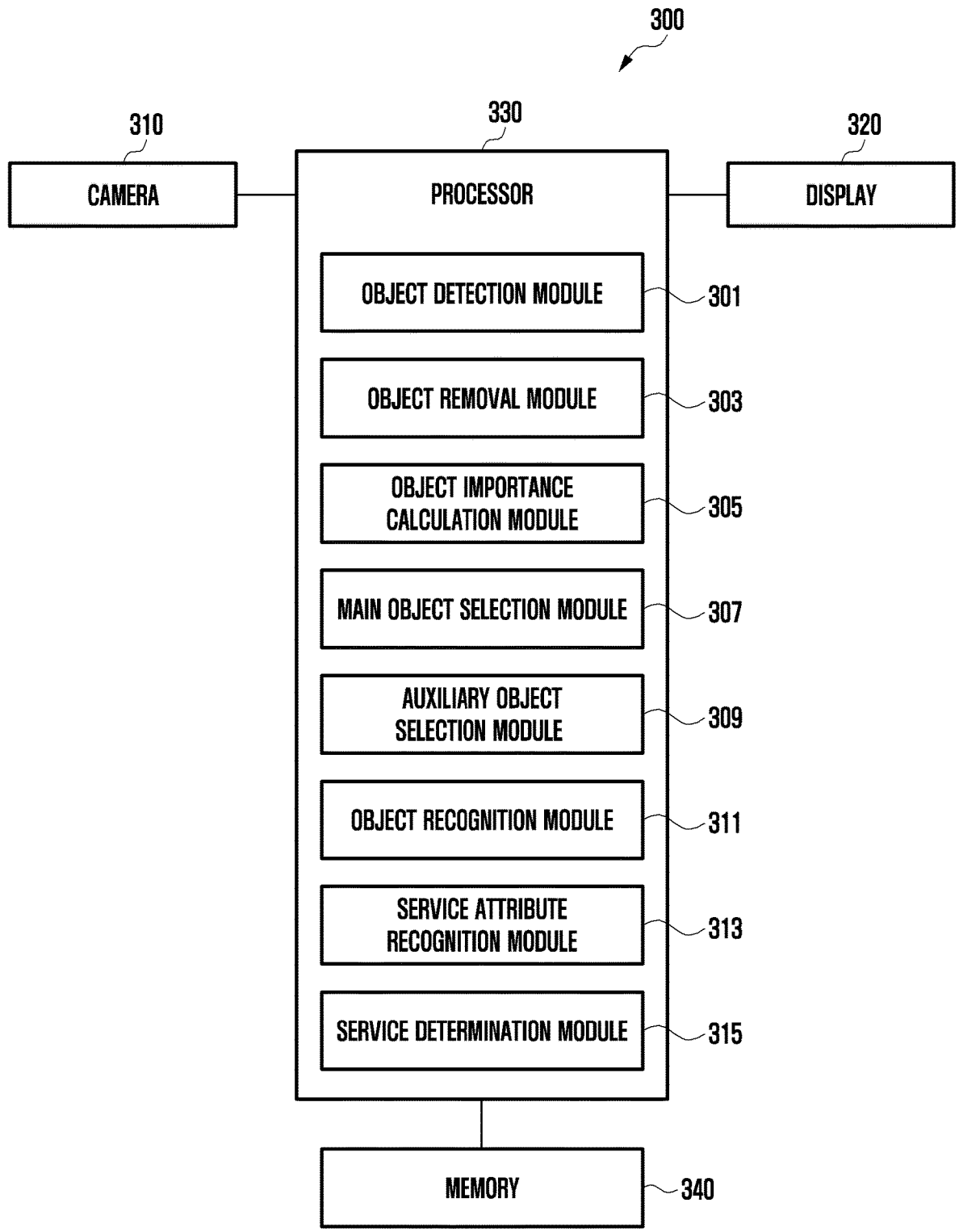
FIG. 3 is a block diagram illustrating a configuration of an electronic device according to an embodiment of the disclosure.

FIG. 3 is a block diagram illustrating a configuration of an electronic device according to an embodiment of the disclosure.

Referring to FIG. 3, an electronic device 300 according to various embodiments of the disclosure may include a camera 310, a display 320, a processor 330, and a memory 340.

According to various embodiments of the disclosure, the electronic device 300 may include the electronic device 101 in FIG. 1. The camera 310 may include the camera module 180 in FIG. 1 or FIG. 2. The display 320 may include the display device 160 in FIG. 1. The processor 330 may include the processor 120 in FIG. 1. The memory 340 may include the memory 130 in FIG. 1.

According to an embodiment of the disclosure, the camera 310 may obtain an image, such as a still image or a moving image by photographing the surroundings of the electronic device 300.

According to an embodiment of the disclosure, the display 320 may display an image obtained through the camera 310 and objects included in the image. When the user of the electronic device 300 selects an object, the display 320 may display information and a search service corresponding to the selected object.

According to various embodiments of the disclosure, the display 320 may perform an input function and a display function. To this end, the display 320 may include a touch panel. The display 320 may be formed of one of liquid crystal display (LCD), organic light emitting diodes (OLEDs), active matrix organic light emitting diodes (AMOLEDs), flexible display, and transparent display. The display 320 may visually provide the user with menus, input data, function setting information, and other various information of the electronic device 300.

According to an embodiment of the disclosure, the processor 330 may be operably connected to the camera 310, the display 320, and the memory 340. The processor 330 may control functions and operations of the camera 310, the display 320, and the memory 340.

According to various embodiments of the disclosure, the processor 330 may detect plural object regions included in an image obtained by using the camera 310.

According to various embodiments of the disclosure, the processor 330 may remove an object region having a size out of a threshold range from among the detected plural object regions.

According to various embodiments of the disclosure, the processor 330 may calculate the importance of objects within the threshold range.

According to various embodiments of the disclosure, based on the calculated importance, the processor 330 may select main objects whose number is less than or equal to the maximum number of objects allowed in the electronic device 300 (e.g., two objects).

According to various embodiments of the disclosure, the processor 330 may select an auxiliary object having spatial relevance to a selected main object.

According to various embodiments of the disclosure, the processor 330 may recognize the main object and the auxiliary object, and recognize the service attributes provided by the recognized main object and auxiliary object.

According to various embodiments of the disclosure, the processor 330 may determine a service provided by the main object and auxiliary object, and display the determined service by using the display 320.

According to various embodiments of the disclosure, the processor 330 may include an object detection module 301, an object removal module 303, an object importance calculation module 305, a main object selection module 307, an auxiliary object selection module 309, an object recognition module 311, a service attribute recognition module 313, and/or a service determination module 315.

According to an embodiment of the disclosure, the object detection module 301 may detect at least one object region in an image obtained by using the camera 310.

According to an embodiment of the disclosure, among the at least one object region detected by the object detection module 301, the object removal module 303 may remove the object region whose size is out of a threshold range by using context information of the object (e.g., object size and/or position). For example, the object region whose size exceeds or falls below a threshold may be removed.

According to an embodiment of the disclosure, for the remaining objects after removal of object regions through the object removal module 303, the object importance calculation module 305 may calculate the importance of each object based on the confidence information and context (e.g., size and/or position) information of the object.

According to an embodiment of the disclosure, based on the importance calculated through the object importance calculation module 305, the main object selection module 307 may select regions corresponding to main objects whose number is less than or equal to the maximum number of objects allowed in the electronic device 300 (e.g., two or three objects).

According to an embodiment of the disclosure, based on the region (e.g., position) of a main object selected by the main object selection module 307, the auxiliary object selection module 309 may select an auxiliary object related to the main object from among the objects detected by the object detection module 301.

According to various embodiments of the disclosure, the auxiliary object selection module 309 may select an object overlapping a main object (e.g., region) as an auxiliary object. The auxiliary object selection module 309 may select an object having spatial relevance to a selected main object as an auxiliary object. The spatial relevance may be obtained by using the degree of overlap between the main object region and the auxiliary object region and the inclusion relationship between the main object region and the auxiliary object region.

According to an embodiment of the disclosure, the object recognition module 311 may recognize the type of an auxiliary object present in the region of a main object.

According to an embodiment of the disclosure, the service attribute recognition module 313 may recognize whether the main object and the auxiliary object have service attributes provided by the electronic device 300. For example, when the electronic device 300 provides a text service, it is possible to determine whether text is present in the regions of the main object and auxiliary object.

According to various embodiments of the disclosure, the service attribute recognition module 313 may recognize a service attribute stored in, for example, the memory 340 (e.g., the memory 130 in FIG. 1). In addition, the service attribute recognition module 313 may recognize a service attribute downloadable from another electronic device (e.g., the external electronic device 102 or 104, or the server 108 in FIG. 1) through a network (e.g., first network 198 or second network 199 in FIG. 1). According to various embodiments of the disclosure, the service attribute may provide an available service (e.g., similar image search, product search, wine search, text search, location-based service, QR code or barcode) from an image obtained using the camera 310, an image stored in the memory 340, or an image obtained from another electronic device through a network (e.g., the first network 198 or the second network 199 in FIG. 1) based on a usage profile of the electronic device 300. The service attribute recognition module 313 may determine a service attribute that can be provided by using a main object and auxiliary object, and may determine the service card (e.g., shopping or image search) to be displayed.

According to an embodiment of the disclosure, the service determination module 315 may determine a service that can be provided by the main object and auxiliary object by combining the results of the object recognition module 311 and the service attribute recognition module 313. The service determination module 315 may display the positions and available services of the main object and auxiliary object through the display 320.

According to various embodiments of the disclosure, the service determination module 315 may determine, for example, whether to request an image from another electronic device (e.g., the external electronic device 102 or 104, or the server 108 in FIG. 1) based on the service attribute recognized through the service attribute recognition module 313. The service determination module 315 may make an image request to another electronic device (e.g., the external electronic device 102 or 104, or the server 108 in FIG. 1) through a network (e.g., the first network 198 or the second network 199 in FIG. 1), and display a service attribute result regarding an object included in the image received after the request on the display 320.

According to various embodiments of the disclosure, the processor 330 may control the overall operation and signal flows between internal components of the electronic device 300, and may perform data processing functions. The processor 330 may include, for example, a central processing unit (CPU), an application processor, and a communication processor. The processor 330 may include a processor (e.g., a sensor hub) that operates with lower power than the application processor. The processor 330 may include both an application processor and a sensor hub. The processor 330 may be formed of a single core processor or a multi-core processor, and may include a plurality of processors.

According to an embodiment of the disclosure, the memory 340 may store images obtained by using the camera 310. The memory 340 may store programs executed by the object detection module 301, object removal module 303, object importance calculation module 305, main object selection module 307, auxiliary object selection module 309, object recognition module 311, service attribute recognition module 313, and/or service determination module 315, which are included in the processor 330. The memory 340 may store programs related to services that can be provided by the electronic device 300 through the processor 330.

According to various embodiments of the disclosure, the memory 340 may store programs for processing and controlling the processor 330, an operating system (OS), various applications, and programs that perform a function of storing input/output data and control the overall operation of the electronic device 300. The memory 340 may store a user interface (UI) provided by the electronic device 300 and various configuration information required for function processing in the electronic device 300.

Figure 4:
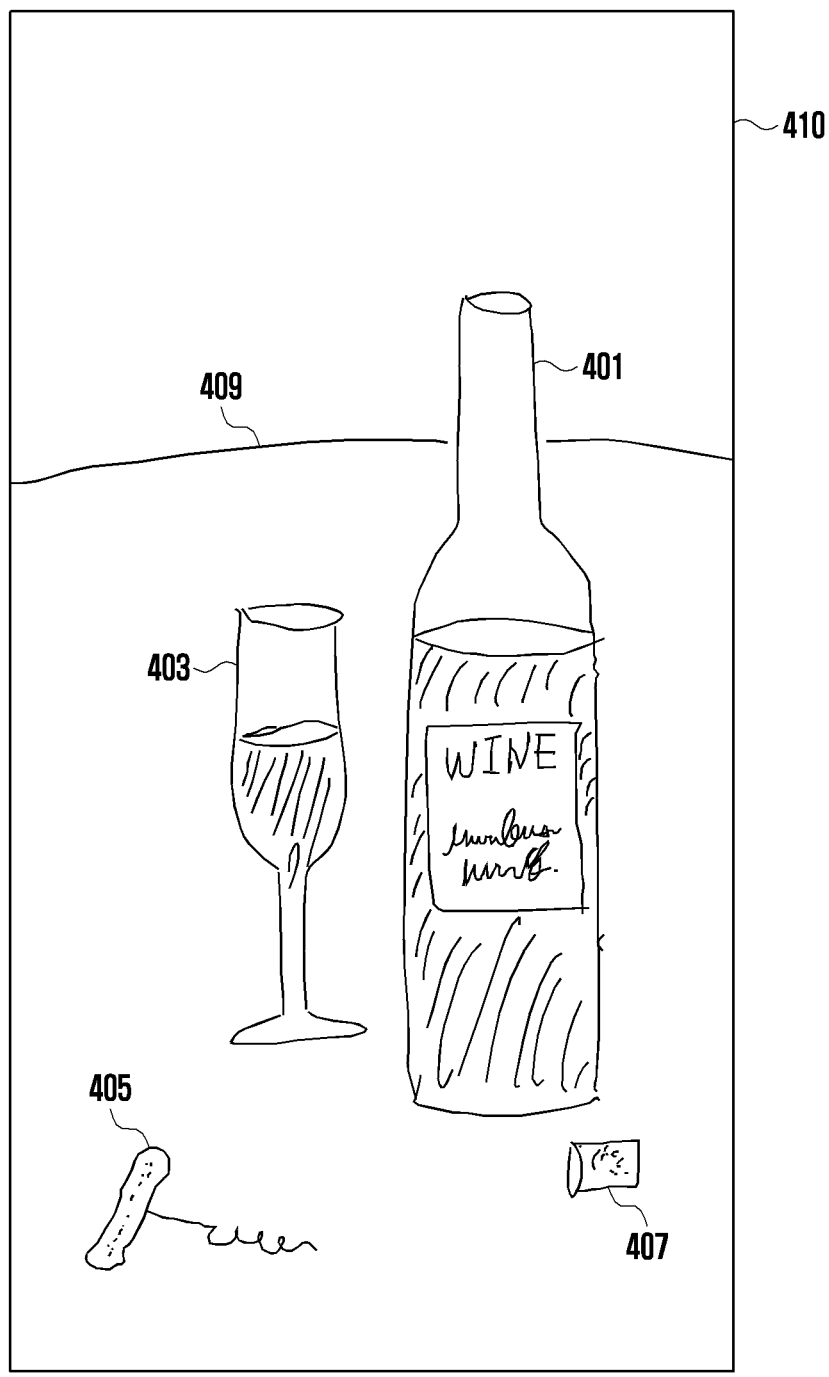
FIG. 4 is a diagram illustrating an image obtained by using a camera of an electronic device according to an embodiment of the disclosure.

FIG. 4 is a diagram illustrating an image obtained by using a camera of an electronic device according to an embodiment of the disclosure.

Referring to FIG. 4, an image 410 obtained by using the camera 310 may include at least one object.

According to an embodiment of the disclosure, the image 410 may include a first object 401, a second object 403, a third object 405, a fourth object 407, and a fifth object 409.

For example, the first object 401 may include a wine bottle. The second object 403 may include a wine glass. The third object 405 may include a wine opener. The fourth object 407 may include a wine stopper. The fifth object 409 may include a dining table.

According to an embodiment of the disclosure, the first object 401, the second object 403, the third object 405, the fourth object 407, and the fifth object 409 may be candidate objects that can be selected as a main object providing a service.

Figure 5:
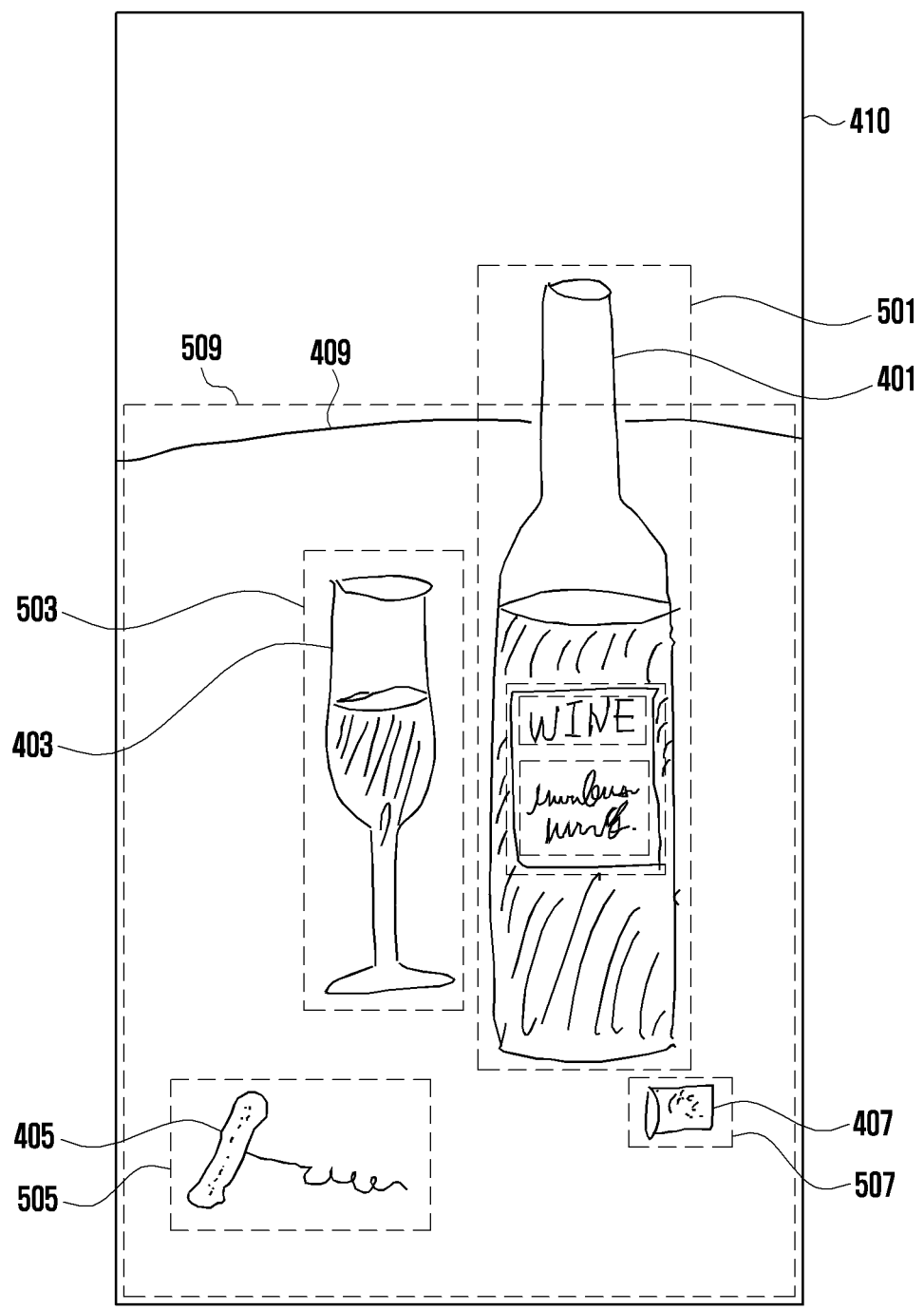
FIG. 5 is a diagram illustrating detecting at least one object in an image by using a processor of an electronic device according to an embodiment of the disclosure.

FIG. 5 is a diagram illustrating detecting at least one object in an image by using a processor of an electronic device according to an embodiment of the disclosure.

Referring to FIG. 5, the object detection module 301 of the processor 330 may detect a region of each object included in the image 410.

According to an embodiment of the disclosure, the object detection module 301 may detect a first object region 501 corresponding to the first object 401. The object detection module 301 may detect a second object region 503 corresponding to the second object 403. The object detection module 301 may detect a third object region 505 corresponding to the third object 405. The object detection module 301 may detect a fourth object region 507 corresponding to the fourth object 407. The object detection module 301 may detect a fifth object region 509 corresponding to the fifth object region 509.

Figure 6:
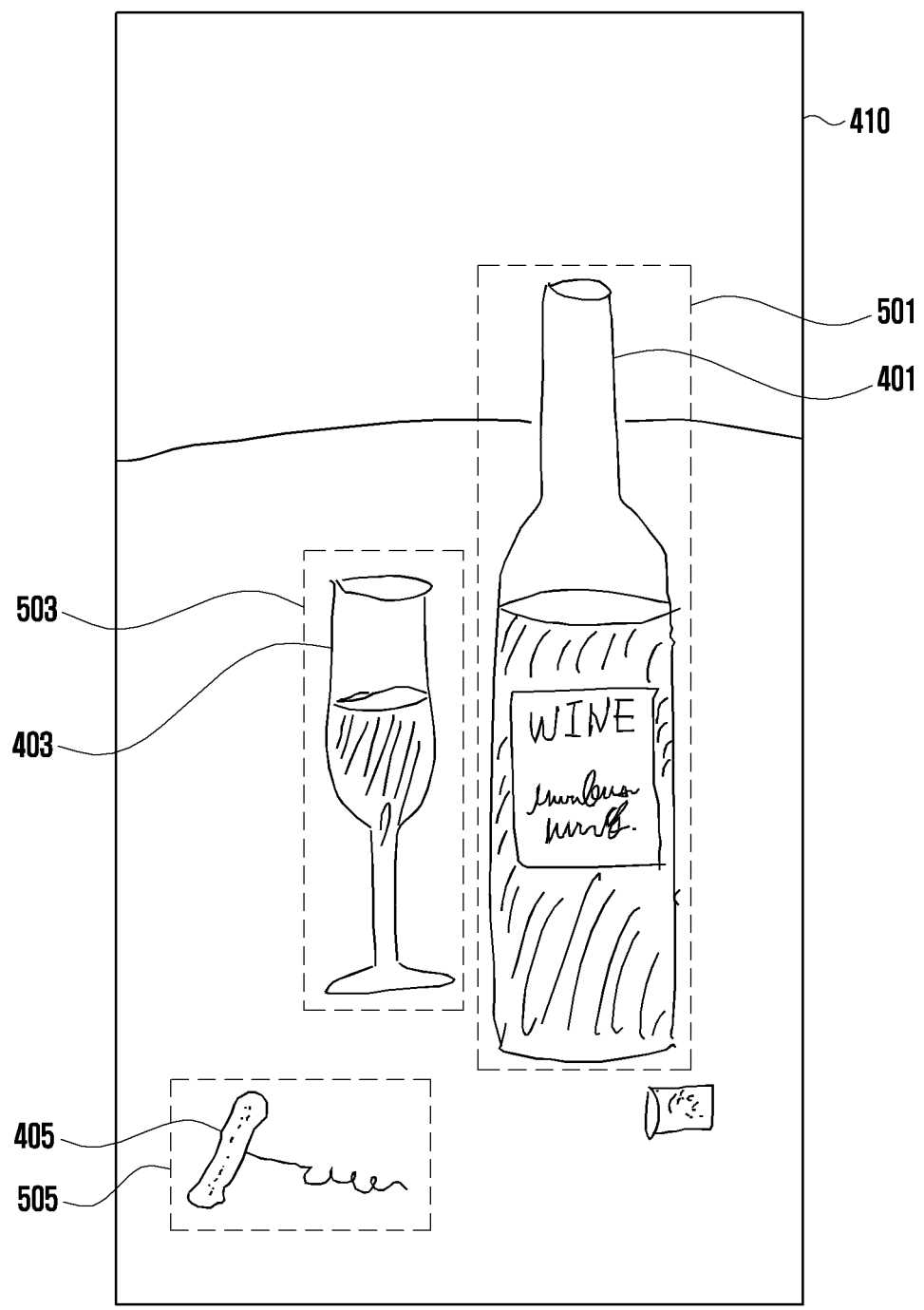
FIG. 6 is a diagram illustrating removing at least one object region by using a processor of an electronic device according to an embodiment of the disclosure.

FIG. 6 is a diagram illustrating removing at least one object region by using a processor of an electronic device according to an embodiment of the disclosure.

Referring to FIG. 6, the object removal module 303 of the processor 330 may remove an object region whose size is out of a preset threshold range from among the first object region 501, second object region 503, third object region 505, fourth object region 507, and fifth object region 509 detected by the object detection module 301.

According to an embodiment of the disclosure, the object removal module 303 may remove the fourth object region 507 and the fifth object region 509 that are too small or too large to thereby be out of the threshold range.

Referring to FIG. 6, the first object region 501, the second object region 503, and the third object region 505, whose object region size is within the threshold range, may be maintained.

Figure 7:
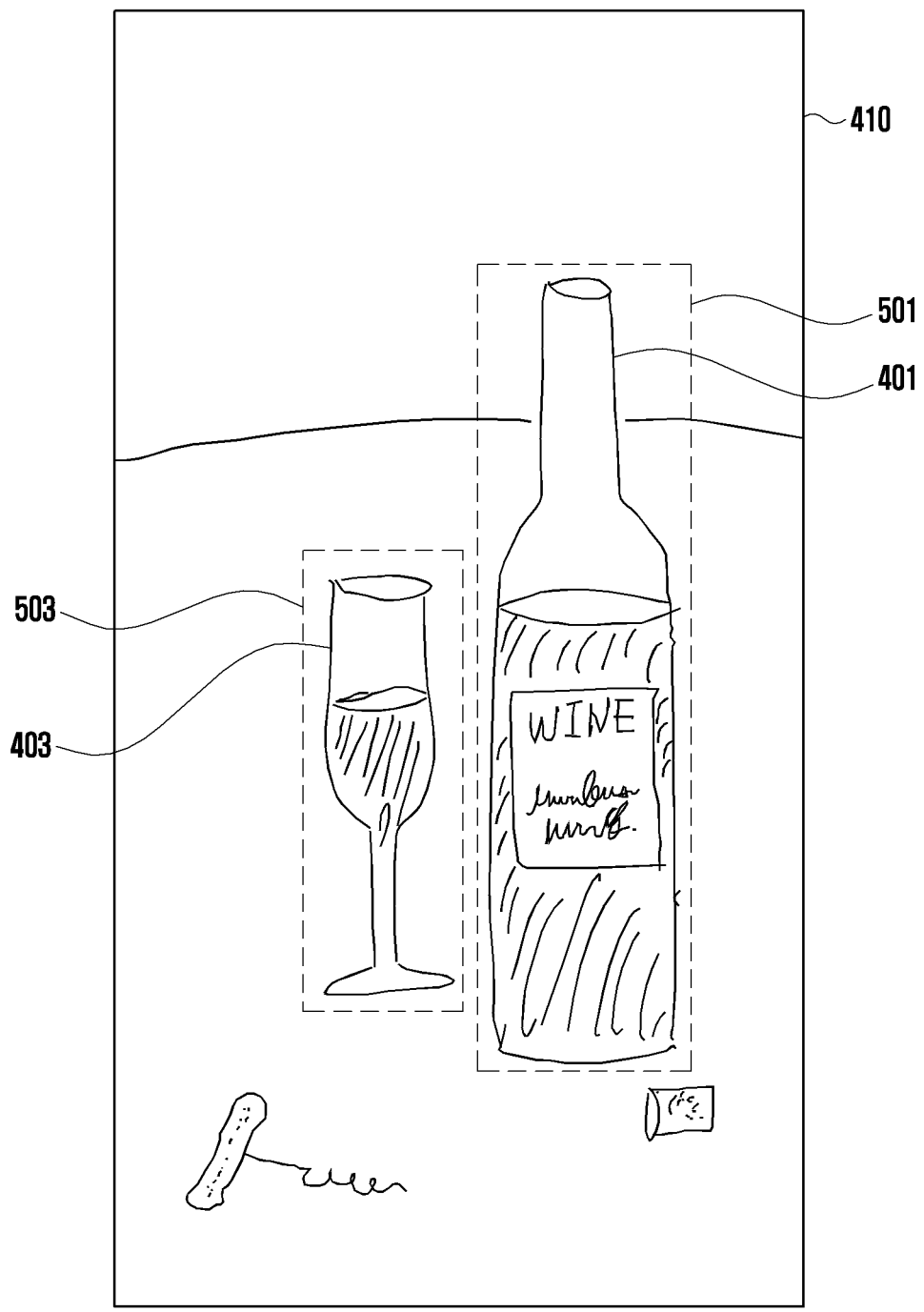
FIG. 7 is a diagram illustrating calculating an importance of objects and selecting a main object region by using a processor of an electronic device according to an embodiment of the disclosure.

FIG. 7 is a diagram illustrating calculating an importance of objects and selecting a main object region by using a processor of an electronic device according to an embodiment of the disclosure.

Referring to FIG. 7, the object importance calculation module 305 of the processor 330 may calculate the importance of each object, based on the confidence information and context information (e.g., object size and/or position) of the object, among the first object region 501, the second object region 503, and the third object region 505 remaining after object region removal through the object removal module 303. The main object selection module 307 of the processor 330 may select main object regions whose number is less than or equal to the maximum number of objects allowed in the electronic device 300 (e.g., two) based on the importance calculated through the object importance calculation module 305.

Referring to FIG. 7, the main object selection module 307 of the processor 330 may select, for example, the first object region 501 corresponding to the first object 401 having high importance, and the second object region 503 corresponding to the second object 403 as a main object.

Figure 8:
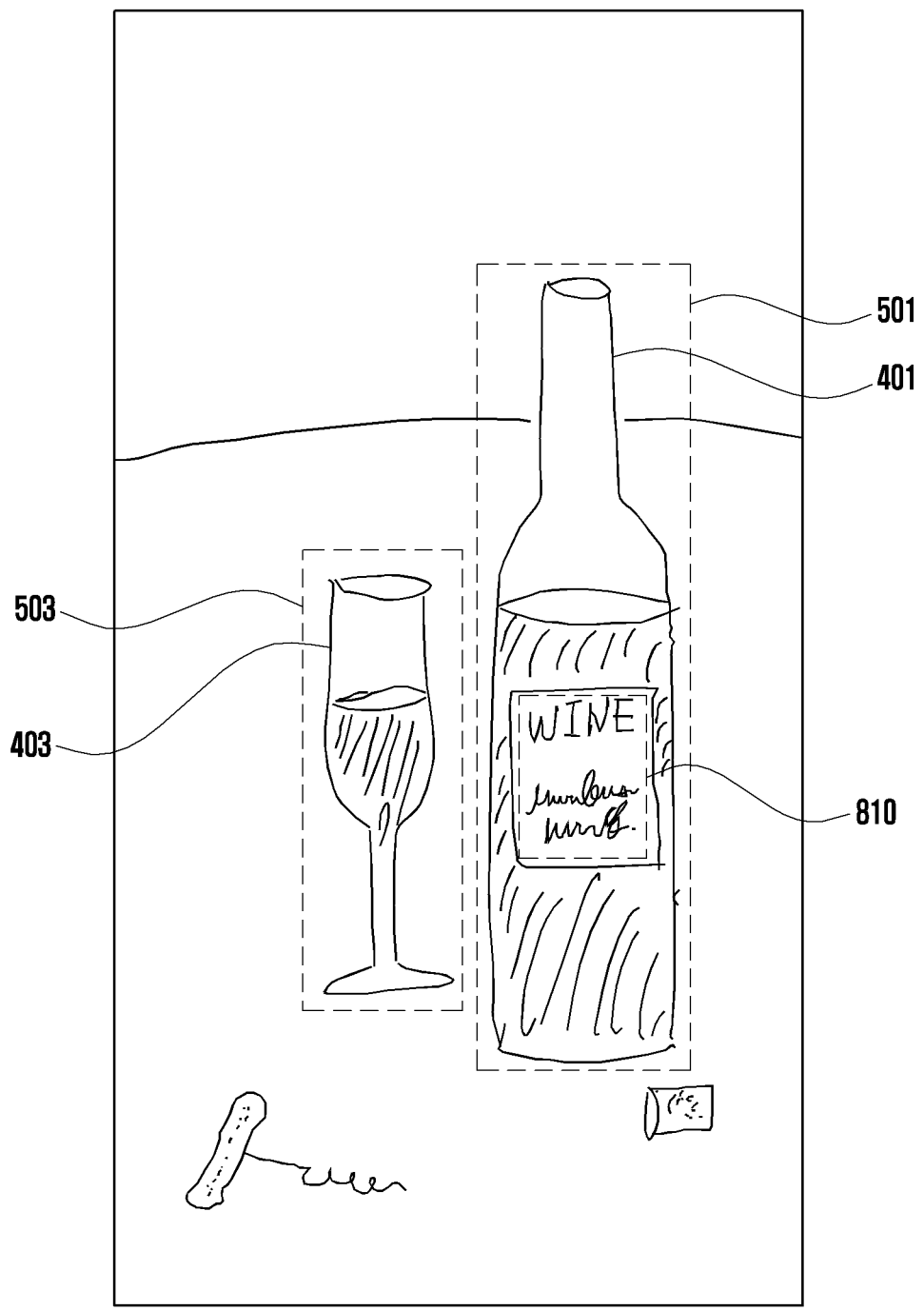
FIG. 8 is a diagram illustrating selecting an auxiliary object by using a processor of an electronic device according to an embodiment of the disclosure.

FIG. 8 is a diagram illustrating selecting an auxiliary object by using a processor of an electronic device according to an embodiment of the disclosure.

Referring to FIG. 8, the auxiliary object selection module 309 of the processor 330 may select, for example, an auxiliary object 810 having spatial relevance to the first object region 501 based on the positions of the first object region 501 and the second object region 503 selected as a main object by the main object selection module 307.

Figure 9:
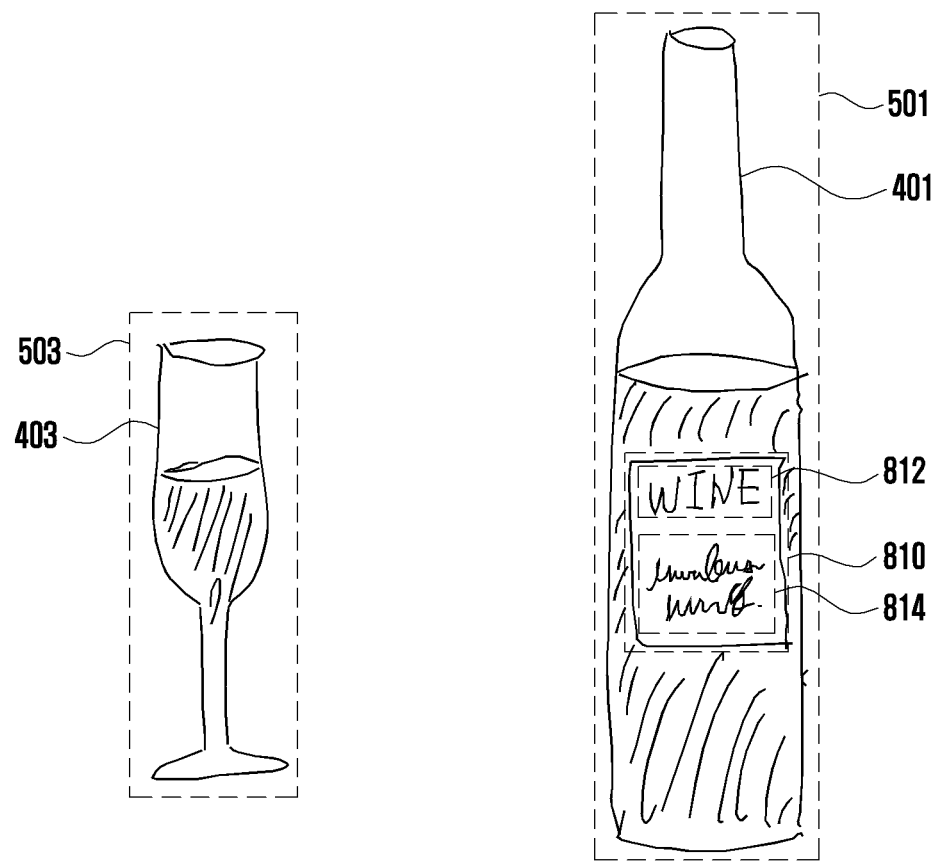
FIG. 9 is a diagram illustrating determining a service to be provided by using a processor of an electronic device according to an embodiment of the disclosure.

FIG. 9 is a diagram illustrating determining a service to be provided by using a processor of an electronic device according to an embodiment of the disclosure.

Referring to FIG. 9, the object recognition module 311 of the processor 330 may recognize the first object 401 included in the first object region 501 and the second object 403 included in the second object region 503. The service attribute recognition module 313 of the processor 330 may recognize service attributes provided by the first object 401 including the auxiliary object 810 and the second object 503. The service determination module 315 of the processor 330 may determine services provided by the first object 401 and the second object 403 by combining the results of the object recognition module 311 and the service attribute recognition module 313.

Referring to FIG. 9, the first object 401 may provide a first service 901 (e.g., wine information search), a second service 903 (e.g., translation), a third service 905 (e.g., shopping), and a fourth service 907 (e.g., image search). The second object 403 may provide a fifth service 911 (e.g., shopping) and a sixth service 913 (e.g., image search).

According to an embodiment of the disclosure, the first object 401 may include the auxiliary object 810. The auxiliary object 810 may include, for example, first information 812 (e.g., wine label) and second information 814 (e.g., text) related to a description of the wine.

According to an embodiment of the disclosure, the first service 901 (e.g., wine information search) and the second service 903 (e.g., translation) of the first object 401 may be obtained from the first information 812 (e.g., wine label) and the second information 814 (e.g., text) of the auxiliary object 810.

Figure 10:
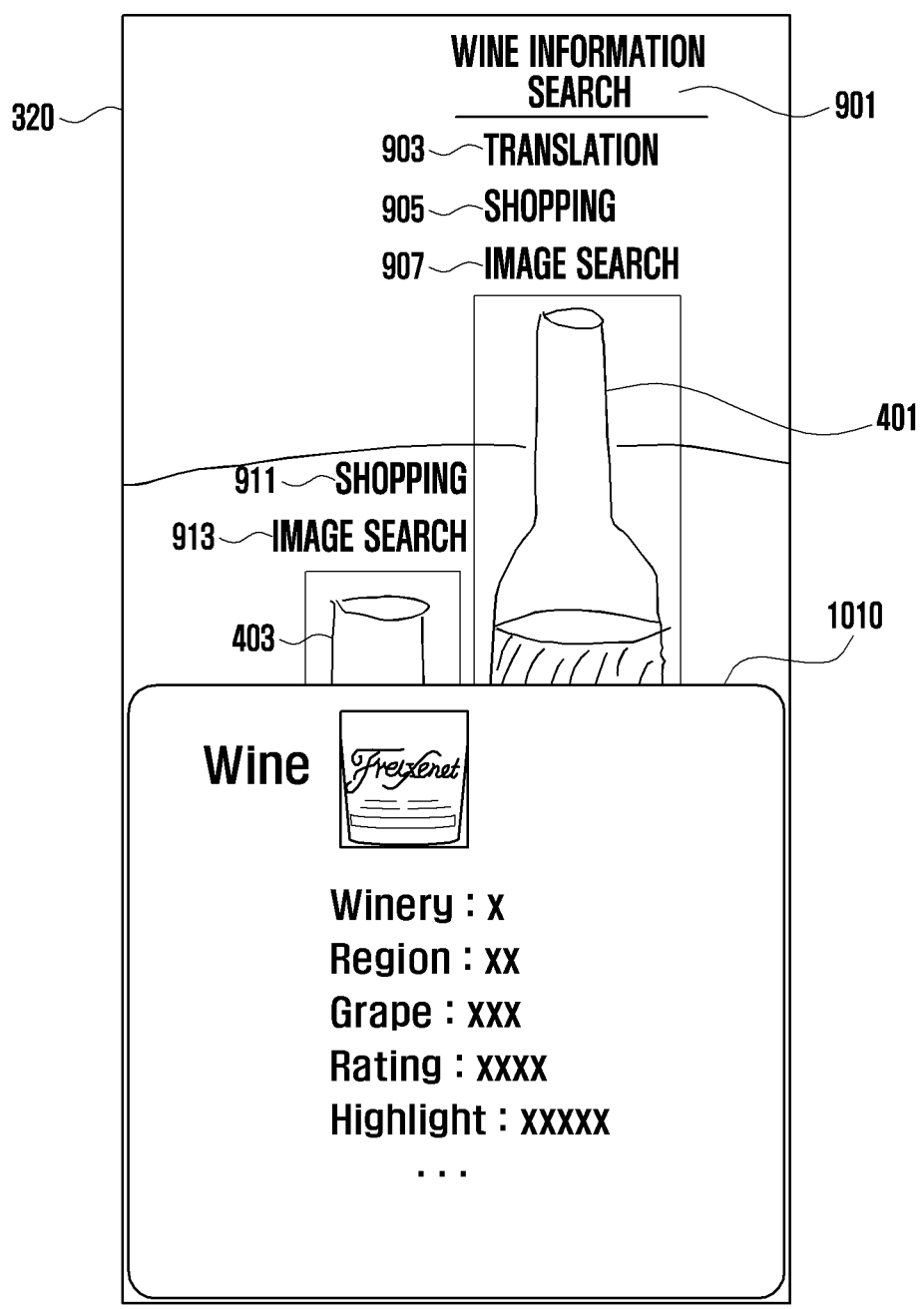
FIG. 10 is a diagram illustrating utilizing a determined service by using a processor of an electronic device according to an embodiment of the disclosure.

FIG. 10 is a diagram illustrating utilizing a determined service by using a processor of an electronic device according to an embodiment of the disclosure.

Referring to FIG. 10, the display 320 may display a service list from which the user of the electronic device 300 can select a desired service.

According to an embodiment of the disclosure, the first object 401 may provide a first service 901 (e.g., wine information search), a second service 903 (e.g., translation), a third service 905 (e.g., shopping), and a fourth service 907 (e.g., image search). The second object 403 may provide a fifth service 911 (e.g., shopping) and a sixth service 913 (e.g., image search).

According to an embodiment of the disclosure, when the user of the electronic device 300 selects the first service 901 (e.g., wine information search) of the first object 401 from the list of services displayed on the display 320, the processor 330 may display detailed information 1010 corresponding to the first service 901 (e.g., wine information search) on the display 320. For example, the detailed information 1010 may include at least one of winery, region, grape, rating, or highlight information for the wine.

Figure 11:
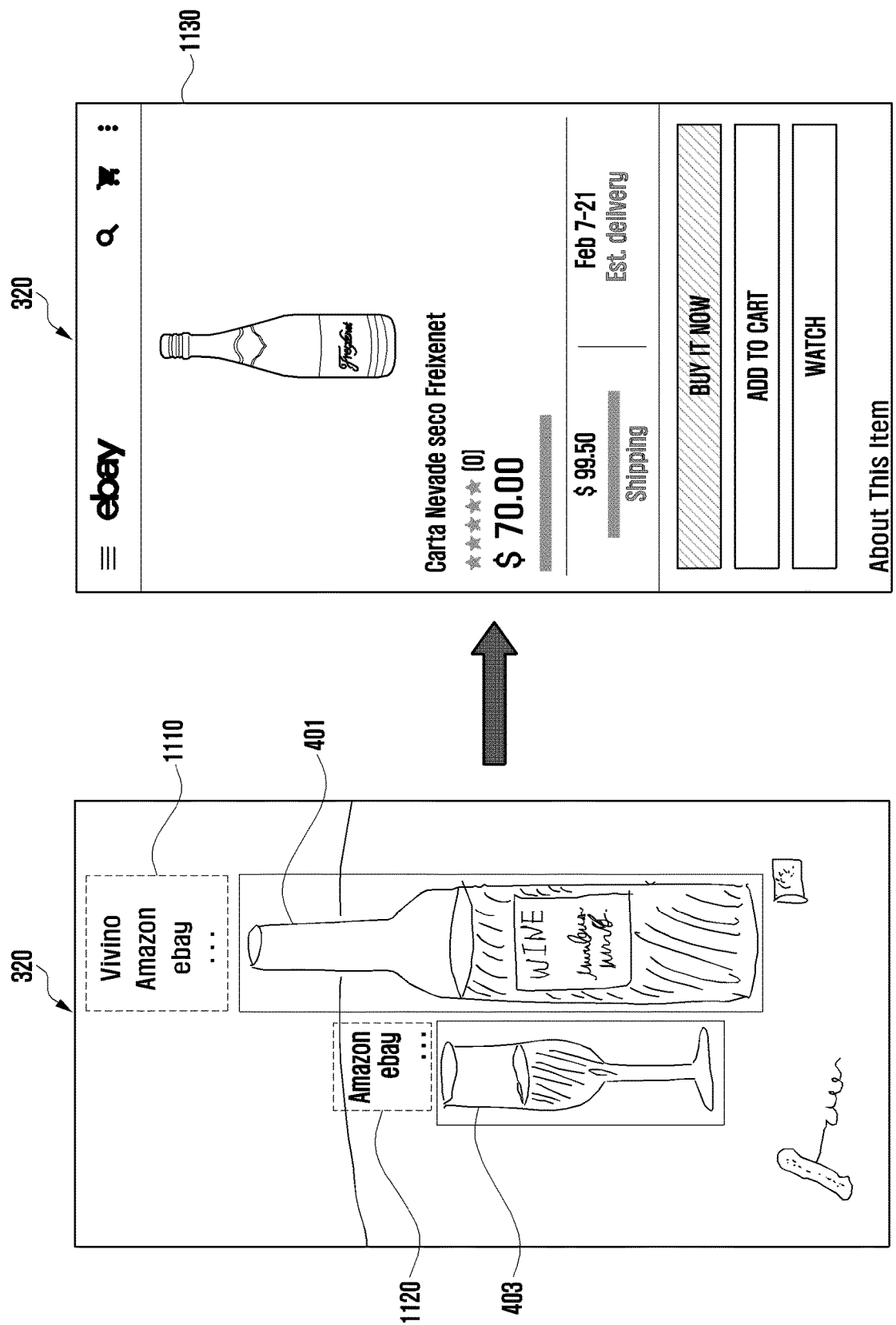
FIG. 11 is a diagram illustrating providing a service corresponding to selection of an object by using a processor of an electronic device according to various embodiments of the disclosure.

FIG. 11 is a diagram illustrating providing a service corresponding to object selection by using a processor of an electronic device according to an embodiment of the disclosure.

Referring to FIG. 11, the display 320 may display a first additional service list 1110 for the first object 401, and a second additional service 1120 for the second object 403. The first additional service list 1110 and the second additional service list 1120 may include entry points of applications that provide services related respectively to the first object 401 and the second object 403.

According to an embodiment of the disclosure, the applications providing services related to the first object 401 and the second object 403 may include, for example, an application that is downloaded by the electronic device 300 from another electronic device (e.g., the server 108 in FIG. 1) through a network (e.g., the second network in FIG. 1).

According to an embodiment of the disclosure, when the user of the electronic device 300 selects 'ebay' from the first additional service list 1110 of the first object 401, the processor 330 may display an entry screen 1130 related to the 'ebay' application through the display 320.

Figure 12:
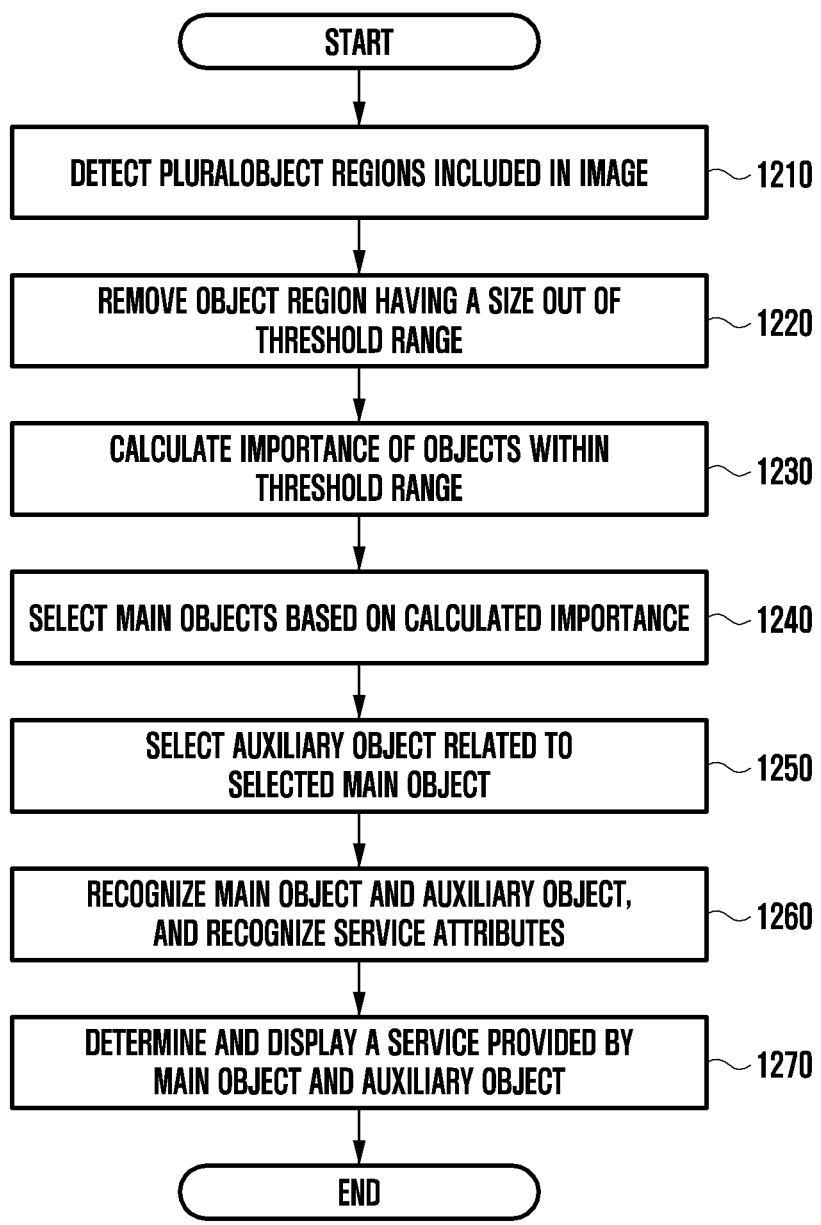
FIG. 12 is a flowchart illustrating a method for providing a service corresponding to object selection in an electronic device according to an embodiment of the disclosure.

FIG. 12 is a flowchart illustrating a method for providing a service corresponding to object selection in an electronic device according to an embodiment of the disclosure.

Referring to FIG. 12, the operation may be performed by, for example, the electronic device 300 of FIG. 3. For example, operations 1210 to 1270 disclosed in FIG. 12 may be performed by the processor 330 of the electronic device 300.

At operation 1210, the processor 330 (e.g., the object detection module 301) may detect a plurality of object regions included in an image obtained by using the camera 310.

At operation 1220, the processor 330 (e.g., the object removal module 303) may remove an object region having a size out of a threshold range among the detected plural object regions.

According to an embodiment of the disclosure, among the plural object regions detected using the object detection module 301, the processor 330 may remove an object region that is too small or too large to thereby be out of the threshold range based on context information (e.g., object size and/or position) of the object.

At operation 1230, the processor 330 (e.g., the object importance calculation module 305) may calculate the importance of objects within the threshold range.

According to an embodiment of the disclosure, for the objects remaining after object region removal through the object removal module 303, the processor 330 may calculate the importance of each object based on the confidence information and context information (e.g., object size and/or position) of the object.

At operation 1240, the processor 330 (e.g., the main object selection module 307) may select main objects whose number is less than or equal to the maximum number of objects allowed in the electronic device 300 (e.g., two objects).

According to an embodiment of the disclosure, the maximum number of objects allowed in the electronic device 300 may be set in advance according to the specification of the electronic device 300.

At operation 1250, the processor 330 (e.g., auxiliary object selection module 309) may select an auxiliary object having spatial relevance to the selected main object.

At operation 1260, the processor 330 (e.g., the object recognition module 311 and service attribute recognition module 313) may recognize the main object and the auxiliary object, and may recognize service attributes provided by the recognized main object and auxiliary object.

At operation 1270, the processor 330 (e.g., the service determination module 315) may determine a service provided by the main object and the auxiliary object, and display the determined service on the display 320.

Figure 13:
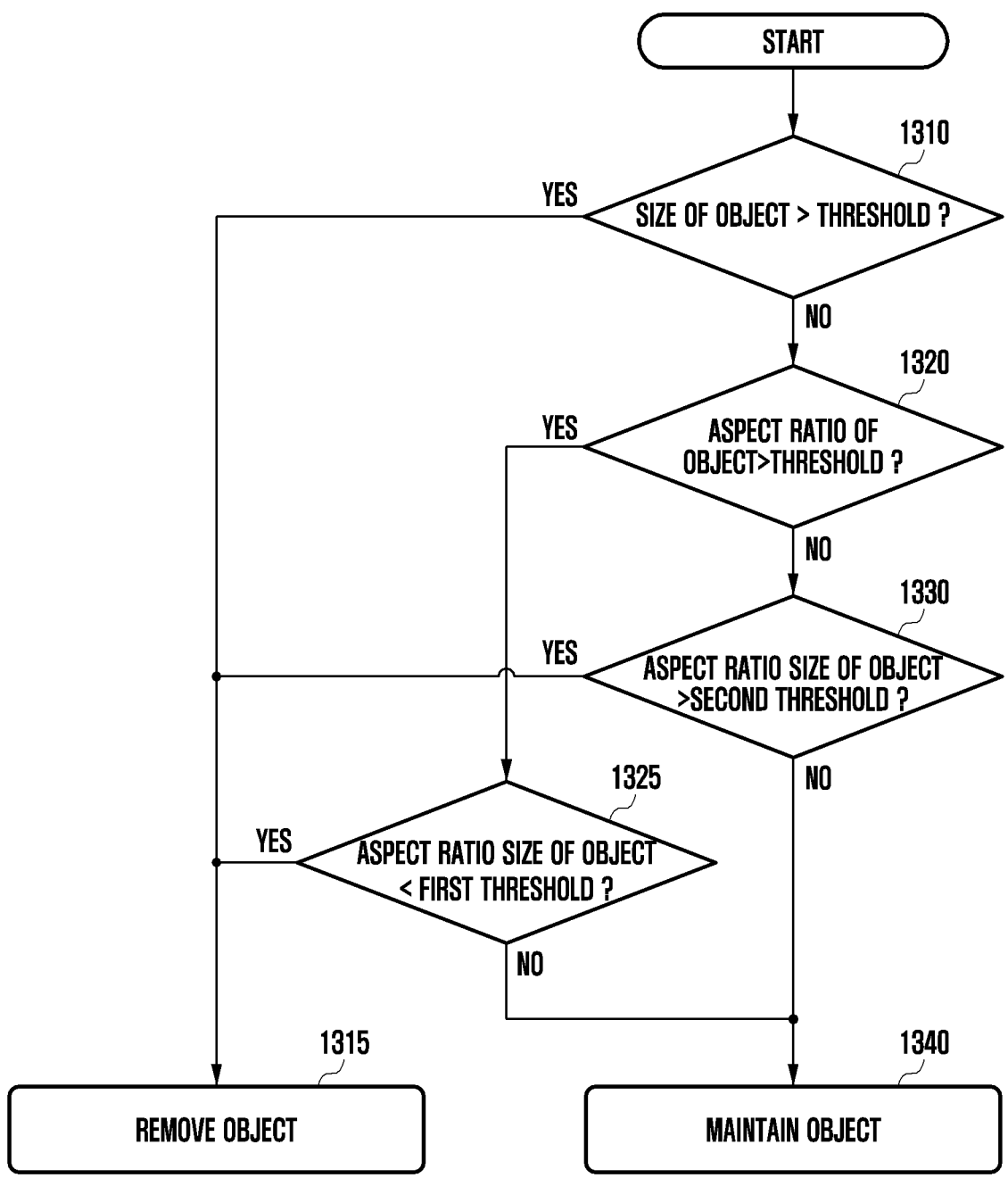
FIG. 13 is a flowchart illustrating a method of removing a region of an object having a size out of a threshold range in an electronic device according to an embodiment of the disclosure.

FIG. 13 is a flowchart illustrating a method of removing a region of an object having a size out of a threshold range in an electronic device according to an embodiment of the disclosure.

FIG. 13 may include subroutines of operation 1220 described in FIG. 12.

Referring to FIG. 13, at operation 1310, the processor 330 (e.g., the object removal module 303) may determine whether the size of an object exceeds a preset threshold among the plural object regions detected by the object detection module 301.

If the size of the object exceeds the preset threshold, at operation 1315, the processor 330 may remove the object exceeding the threshold.

If the size of the object does not exceed the preset threshold, at operation 1320, the processor 330 may determine whether the aspect ratio of the object having a size that does not exceed the preset threshold exceeds a preset threshold.

According to an embodiment of the disclosure, the aspect ratio of the object not exceeding the threshold may be set with different first and second thresholds.

If the aspect ratio of the object whose size does not exceed the threshold exceeds the preset threshold, at operation 1325, the processor 330 may determine whether the aspect ratio size of the object is less than the first threshold.

If the aspect ratio size of the object is less than the first threshold as the result of determination at operation 1325, at operation 1315, the object whose aspect ratio size is less than the first threshold may be removed.

If the aspect ratio size of the object is not less than the first threshold as the result of determination at operation 1325, at operation 1340, the processor 330 may maintain the object whose aspect ratio is not less than the first threshold as it is.

If the aspect ratio of the object whose size does not exceed the threshold does not exceed the preset threshold, at operation 1330, the processor 330 may determine whether the aspect ratio size of the object is less than the second threshold.

If the aspect ratio size of the object is less than the second threshold as the result of determination at operation 1330, at operation 1315, the object whose aspect ratio size is less than the second threshold may be removed.

If the aspect ratio size of the object is not less than the second threshold as the result of determination at operation 1330, at operation 1340, the processor 330 may maintain the object whose aspect ratio is not less than the second threshold as it is.

According to various embodiments of the disclosure, it is possible to remove an object whose size is out of a threshold range through the embodiment disclosed in FIG. 13.

According to various embodiments of the disclosure, although the size of an object is described as an example in the embodiment of FIG. 13, an object can be removed by using the position of the object or the user's history of the object. For example, the object position can be used to remove an object that is far from the center depending on how close the object is to the center of the image. For example, the user's history for objects may include information on whether the user prefers an object present at a specific position in the image.

Figure 14:
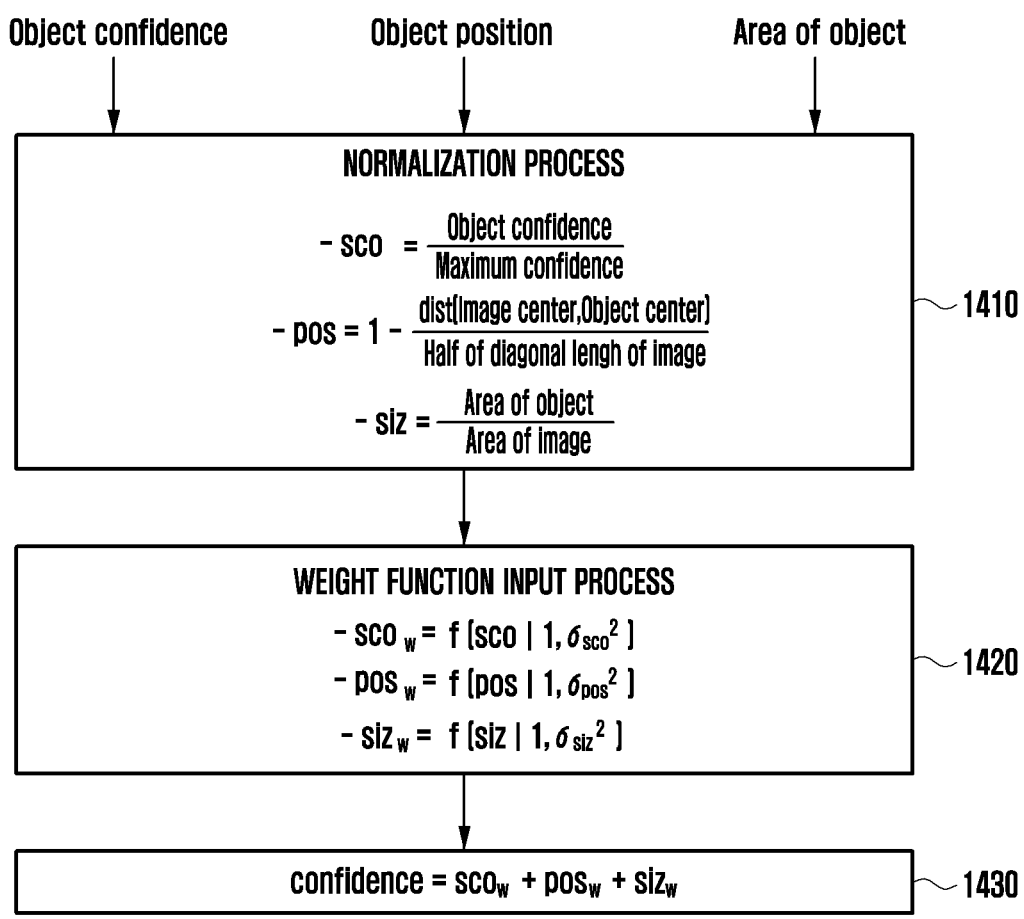
FIG. 14 is a diagram illustrating calculating an importance of an object within a threshold range in an electronic device according to an embodiment of the disclosure.

FIG. 14 is a diagram depicting a method of calculating an importance of an object within a threshold range in an electronic device according to an embodiment of the disclosure.

FIG. 14 may include subroutines of operation 1230 described in FIG. 12.

Referring to FIG. 14, for the remaining objects after object region removal through the object removal module 303, the object importance calculation module 305 of the processor 330 may calculate the importance of an object based on object confidence information, object position information, and object region size information.

At operation 1410, the processor 330 (e.g., the object importance calculation module 305) may perform a normalization process so that the maximum value that each of the object confidence information, the object position information, and the object region size information can have is 1.

According to an embodiment of the disclosure, the score (sco) for the object confidence information may be calculated by object confidence/object maximum confidence.

According to an embodiment of the disclosure, the object position (pos) can be calculated by 1-the distance between the center of the image and the center of the object (dist (image center, object center))/half the diagonal length of the image (half of diagonal length of image).

According to an embodiment of the disclosure, the object region size (siz) may be calculated by object region (object area)/image region (image area).

At operation 1420, the processor 330 may perform a weight function input process by using the values calculated respectively for the object confidence information score, the object position, and the object region size, which have been computed through the normalization process, as inputs of the weight functions (f) with different distributions.

At operation 1430, the processor 330 may calculate the importance of an object through the weight function input process.

According to an embodiment of the disclosure, the importance (confidence) of an object may be calculated by adding the confidence score to which the corresponding weight function is applied (scow), the object position to which the corresponding weight function is applied (posw), and the object region size to which the corresponding weight function is applied.

Figure 15:
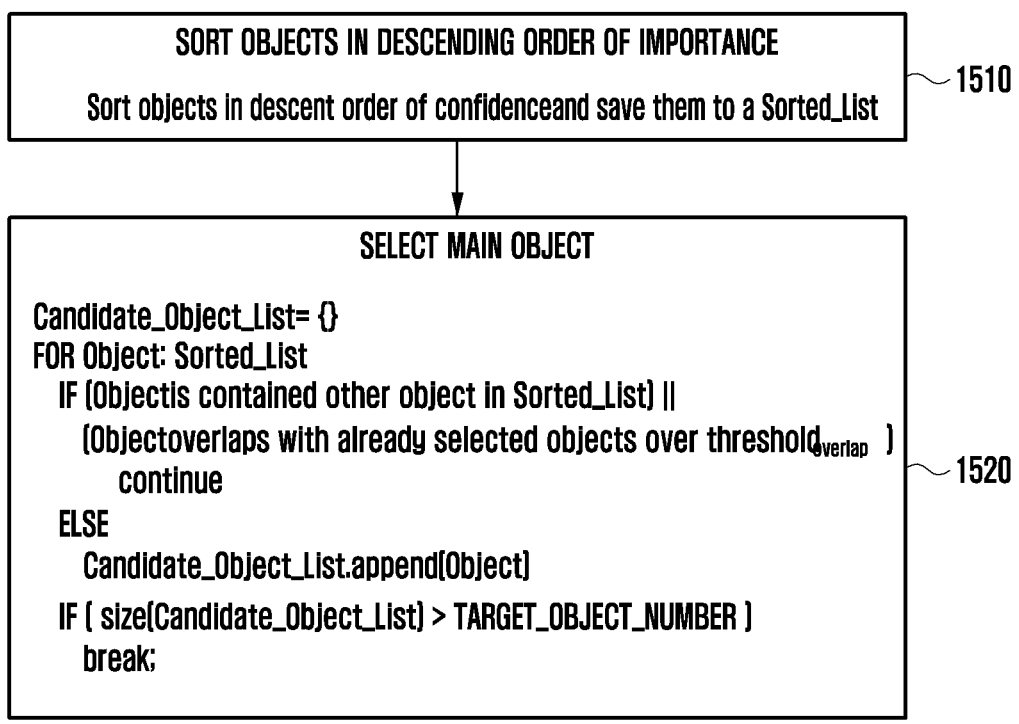
FIG. 15 is a diagram illustrating a method of selecting a main object based on a calculated importance of objects in an electronic device according to an embodiment of the disclosure.

FIG. 15 is a diagram illustrating a method of selecting a main object based on a calculated importance of objects in an electronic device according to an embodiment of the disclosure.

FIG. 15 may include subroutines of operation 1240 described in FIG. 12.

Referring to FIG. 15, the main object selection module 307 of the processor 330 may select main objects whose number is less than or equal to the maximum number of objects allowed in the electronic device 300 (e.g., two objects) based on the importance calculated through the object importance calculation module 305.

At operation 1510, the processor 330 (e.g., the main object selection module 307) may sort the objects in descending order of importance based on the importance of the objects calculated by the object importance calculation module 305.

At operation 1520, the processor 330 may select an object with high importance as a main object.

According to an embodiment of the disclosure, the algorithm disclosed in operation 1520 may include an algorithm that selects an object with high importance as a main object. According to an embodiment of the disclosure, the processor 330 may select objects with high importance whose number is less than or equal to the maximum number of objects allowed in the electronic device 300 (e.g., two objects).

FIG. 16 is a diagram illustrating an algorithm for selecting an auxiliary object by using a processor of an electronic device according to an embodiment of the disclosure.

FIG. 16 may include an algorithm executed for operation 1250 described in FIG. 12.

Referring to FIG. 16, based on a main object selected by the main object selection module 307, the processor 330 (e.g., the auxiliary object selection module 309) may select an auxiliary object having, for example, spatial relevance to the main object.

According to an embodiment of the disclosure, the algorithm of FIG. 16 may represent a process performed for one main object. For example, when there are three main objects, the algorithm of FIG. 16 may be performed three times.

According to an embodiment of the disclosure, the auxiliary object may be defined as an object having spatial relevance to the main object. For example, the spatial relevance may be obtained by using a degree of overlap between the main object region and the auxiliary object region, and an inclusion relationship between the main object region and the auxiliary object region. According to various embodiments of the disclosure, as for the degree of overlap between the main object region and the auxiliary object region, the overlapping area between the main object and the auxiliary object may be quantified by using intersection over union (IoU). For example, an object having an IoU value greater than or equal to a preset threshold may be selected as an auxiliary object.

Figure 17:
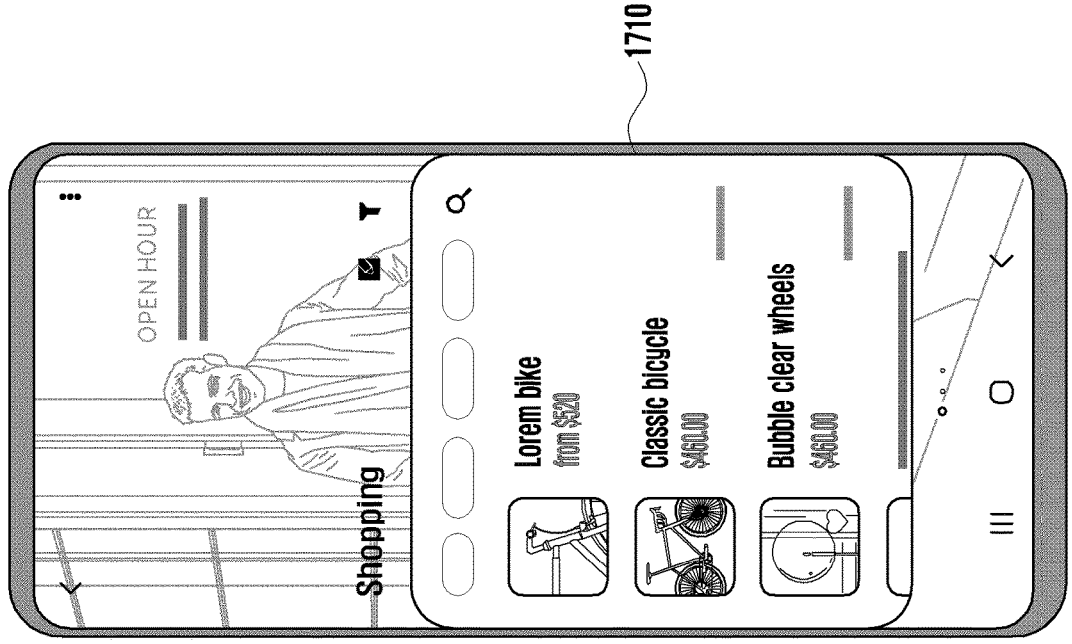
FIG. 17 is a diagram illustrating providing a determined service in an electronic device according to an embodiment of the disclosure.
Figure 17:
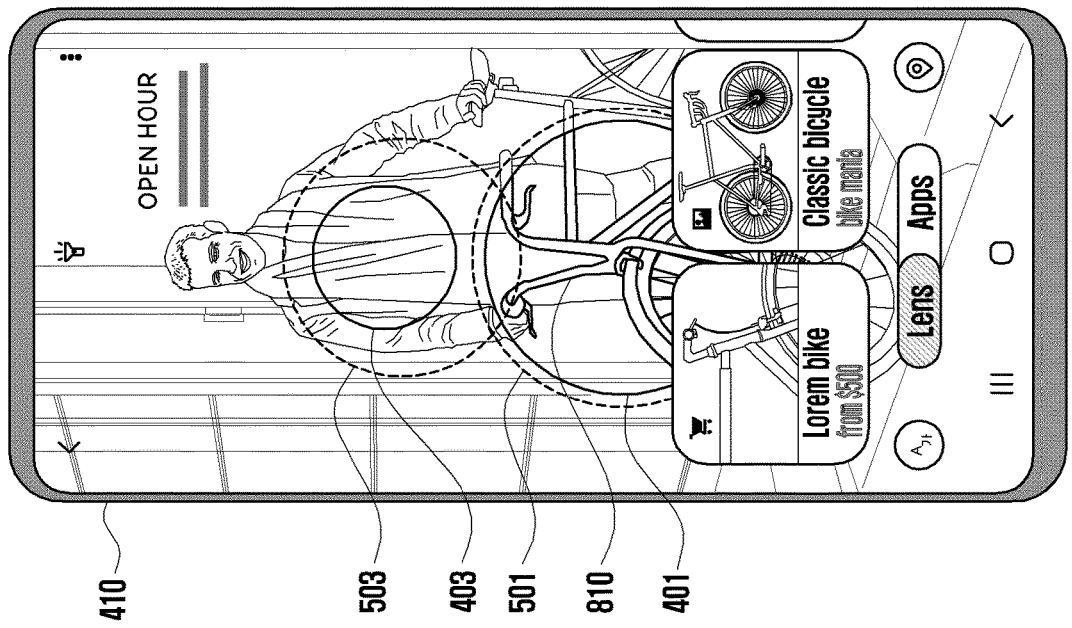

FIG. 17 is a diagram illustrating providing a determined service in an electronic device according to an embodiment of the disclosure.

Referring to FIG. 17, the object detection module 301 of the processor 330 may detect a plurality of object regions included in the image 410.

According to an embodiment of the disclosure, the object detection module 301 may detect a first object region 501 and a second object region 503.

According to an embodiment of the disclosure, the main object selection module 307 may determine a first object 401 and a second object 403 among the detected first object region 501 and second object region 503. The main object selection module 307 may select a main object that provides a service (e.g., the first object 401) based on the object position and object size from among the determined first object 401 and second object 403.

According to an embodiment of the disclosure, the auxiliary object selection module 309 may select an auxiliary object 810 having spatial relevance to the main object (e.g., the first object 401) selected by the main object selection module 307.

According to an embodiment of the disclosure, the object recognition module 311 may recognize the first object 401 and the auxiliary object 810. The service attribute recognition module 313 may determine the number and types of services provided by using the recognized first object 401 and auxiliary object 810.

According to an embodiment of the disclosure, the service determination module 315 may determine a service card provided by the first object 401 and the auxiliary object 810 based on the service attributes (e.g., number and type of services) determined by the service attribute recognition module 313.

According to various embodiments of the disclosure, the service card may include "Lorem bike" (e.g., shopping card) and "classic bicycle" (e.g., image search card)" shown in the drawing.

According to an embodiment of the disclosure, when the service card determined by the service determination module 315 is selected, the processor 330 of the electronic device 300 may display a service screen 1710 that is received from another electronic device (e.g., the external electronic device 102 or 104, or the server 108 in FIG. 1) through a network (e.g., the first network 198 or the second network 199 in FIG. 1).

According to various embodiments of the disclosure, the service cards may be displayed in order based on, for example, the order received from another electronic device. In addition, the service cards may be displayed according to a preset criterion configured in the memory 340 of the electronic device 300. For example, the preset criterion may include a service order most preferred or a service order most recently used by the user of the electronic device 300. In addition, the service cards may be displayed based on a preset order according to a specific object.

Figure 18:
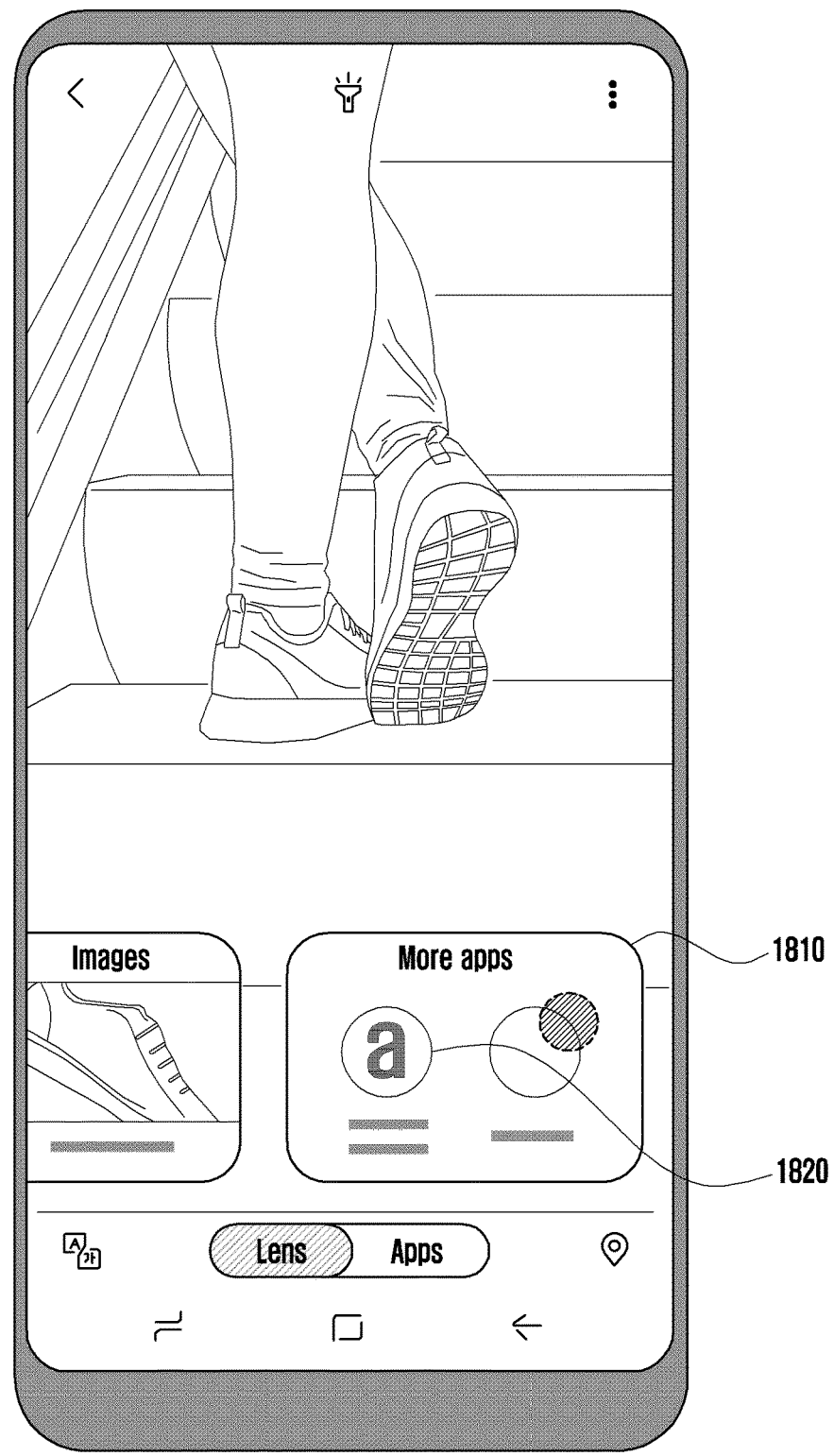
FIG. 18 is a diagram illustrating providing a determined service in an electronic device according to an embodiment of the disclosure.

FIG. 18 is a diagram illustrating providing a determined service in an electronic device according to an embodiment of the disclosure.

Referring to FIG. 18, among the services provided in FIG. 17, for example, when displaying the service card 1810, the processor 330 of the electronic device 300 may display a card image for the service downloaded from another electronic device (e.g., the external electronic device 102 or 104, or the server 108 in FIG. 1) through a network (e.g., the first network 198 or the second network 199 in FIG. 1). In addition, the processor 330 of the electronic device 300 may display an entry point 1820 of an application downloaded from the other electronic device.

According to an embodiment of the disclosure, the processor 330 of the electronic device 300 may provide a detailed vision service related to the image obtained through the camera 310 by using the service downloaded from the other electronic device.

According to various embodiments of the disclosure, it is possible to reduce the amount of computation for detected objects and the time required for service preparation by removing unnecessary objects from among objects (e.g., the first object 401, the second object 403, the third object 405, the fourth object 407, and the fifth object 409 in FIG. 4) detected in an image (e.g., the image 410 in FIG. 4)), calculating the importance of objects, and providing a search service corresponding to the selection of an object with high importance.

While the disclosure has been shown and described with reference to various embodiments thereof, it should be understood by those skilled in the art that various changes in form and details may be made therein without departing from the spirit and scope of the disclosure as defined by the appended claims and their equivalents.

The invention claimed is:

1. An electronic device comprising:
   a camera;
   a display;
   a processor; and
   memory storing instructions that, when executed by the processor, cause the electronic device to;
   obtain an image using the camera,
   display the obtained image on the display,
   detect a plurality of object regions included in the displayed image, determine an object region among the plurality of object regions having a size within a predetermined threshold range, identify a main object and an auxiliary object within the determined object region, the auxiliary object being an object displayed within the main object, recognize a plurality of services respectively related to the main object and the auxiliary object in the identified object region determine, based on a user's selection, a service among the plurality of services respectively related to the main object and the auxiliary object, and display detailed information corresponding to the determined service on the display.

2. The electronic device of claim 1, wherein an object displaying at least one piece of information is determined as the auxiliary object.

3. The electronic device of claim 1, wherein, the instructions, when executed by the processor, cause the electronic device to display, in case that one of the services related to the first main object is selected, an additional service list corresponding to the main object in the display.

4. The electronic device of claim 3, wherein the first additional service list includes entry points of applications providing services related to the main object.

5. A method for a processor of an electronic device to provide a service corresponding to selection of an object in an image, the method comprising:

obtaining the image using a camera;

displaying the obtained image on a display;

detecting, by the processor, a plurality of object regions included in the displayed image;

determining, by the processor, an object region among the plurality of object regions having a size out of a within a predetermined threshold range;

identifying, by the processor, a main object and an auxiliary object within the determined object region, the auxiliary object being an object displayed within the main object;

recognizing, by the processor, a plurality of services respectively related to the main object and the auxiliary object in the identified object region, determining, by the processor, based on a user's selection, a service among the plurality of services respectively related to the main object and the auxiliary object, and displaying, by the processor, detailed information corresponding to the determined service on the display.

6. The method of claim 5, wherein an object displaying at least one piece of information is determined as auxiliary object.

7. The method of claim 5, further comprising:

displaying, in case that one of the services related to the main object is selected, an additional service list corresponding to the main object in the display.

8. The method of claim 7, wherein the additional service list includes entry points of applications providing services related to the main object.

* * * * *